Aug. 13, 1929.   J. K. WILLIAMSON   1,724,629
BANJO HEAD TIGHTENER
Filed Dec. 9, 1926
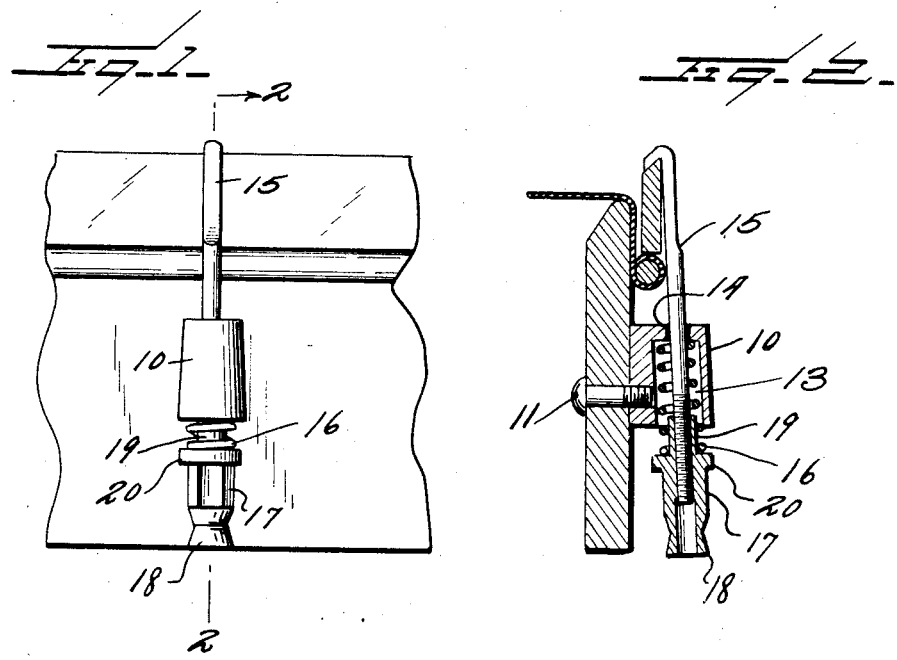
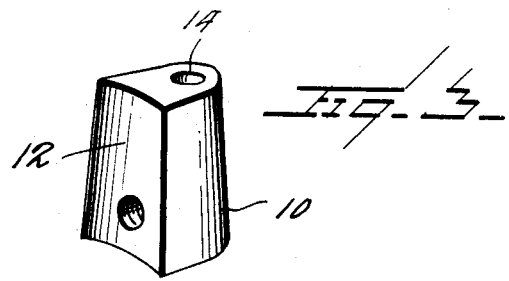
Inventor
J. K. Williamson
By Watson E. Coleman
Attorney Patented Aug. 13, 1929.

1,724,629

UNITED STATES PATENT OFFICE.

JOHN K. WILLIAMSON, OF LEON, IOWA.

BANJO-HEAD TIGHTENER.

Application filed December 9, 1926. Serial No. 153,625.

This invention relates to banjos and particularly to means for tightening banjo heads or the heads of like instruments.

The general object of the invention is to provide a tightening means which embodies a bracket operatively fastened to the rim of the banjo and having extending therethrough the ordinary hook which operatively engages the head, the hook being engaged in turn by a spring which bears against the bracket and urges the hook downward, thus keeping a more or less constant tension upon the head of the banjo and there being means whereby the tension of the spring against the hook may be increased or decreased as desired or, in other words, whereby the head may be tightened from time to time.

My invention is illustrated in the accompanying drawings wherein:—

Figure 1 is an elevation of the device in applied position;

Fig. 2 is a section on the line 2—2 of Figure 1;

Fig. 3 is a perspective view of the bracket enlarged.

Referring to these drawings 10 designates the bracket which is attached to the rim A of the banjo head B by means of the screw 11. This bracket has a concave face 12 which rests against the curved face of the banjo rim. This bracket is preferably thicker at one end than at the other and formed in the thicker end of the bracket is a chamber 13 which is open at its lower end. A perforation 14 passes through the top of this bracket and into the chamber 13. Extending through the perforation 14 is the hook 15 which is the ordinary hook commonly found in banjos and which is threaded at its lower end. This hook engages over the annular member C which causes the tightening of the banjo head B.

Disposed within the chamber 13 is a coiled compression spring 16 and engaging the threaded end of the hook is a nut 17. This nut has a many sided portion whereby a key may be applied to it and below this many sided portion is formed with a prolongation 18. Above the many sided portion the nut is upwardly extended, as at 19, to form a sleeve and to receive the lower end of the spring 16. The spring 16 at its lower end surrounds the sleeve 19 and bears against the shoulder 20 formed at the junction of the sleeve 19 with the many sided portion. This device causes a constant strain to be applied to the banjo head and thus keeps the banjo head tight either in wet weather or dry. At the same time the strain of the banjo head may be increased or decreased at any time by adjusting the nut 17. Of course as many of these devices will be used upon the frame as may be found requisite. The brackets 10 take the place of the brackets ordinarily used in connection with the frames of banjo heads.

I claim:—

1. In a banjo, a head, a rim coacting therewith, a ring operatively engaging the head to tighten the same upon the rim, a bracket having a concave face adapted to fit against the outer face of the rim and detachably engaged with the rim, the bracket being formed to provide a chamber therein extending at right angles to the plane of the head and parallel to the face of the rim, open at its end remote from the head but having a wall at its other end having an aperture therethrough, a rim-engaging hook having a shank passing through said aperture and extending through said chamber and screw-threaded at its end remote from the hook, a nut engaging the screw-threads of the shank and having a cylindrical sleeve-like portion less in diameter than the body of the nut, and a coiled compression spring disposed within the chamber and bearing at one end against the end wall thereof and at its other end bearing against said nut and surrounding the sleeve-like portion.

2. As an article of manufacture, a tightening device for banjo heads comprising a bracket having a longitudinally extending chamber, the chamber being open at one end and provided with an aperture at the other end smaller in diameter than the diameter of the chamber, one outer face of the bracket being concaved to fit against the adjacent face of the banjo head and being formed with a screw-threaded aperture for the passage of a screw, an interiorly screw-threaded nut adapted to engage with the tightening hook of the banjo and having a reduced portion adapted to fit within the open end of said bracket chamber, and a spring disposed within the bracket chamber and bearing at one end against the end wall thereof and at its other end fitting over the reduced portion of the nut and engaging against the head of the nut.

In testimony whereof I hereunto affix my signature.

JOHN K. WILLIAMSON.